US010632391B2

(12) United States Patent
Seymour

(10) Patent No.: US 10,632,391 B2
(45) Date of Patent: Apr. 28, 2020

(54) BUILDING BLOCK TOY FIGURINE AND SYSTEM

(71) Applicant: Arthur F. Seymour, Buffalo Grove, IL (US)

(72) Inventor: Arthur F. Seymour, Buffalo Grove, IL (US)

(73) Assignee: Advins, Inc., Buffalo Grove, IL (US)

( * ) Notice: Subject to any disclaimer, the term of this patent is extended or adjusted under 35 U.S.C. 154(b) by 0 days.

(21) Appl. No.: 16/228,384

(22) Filed: Dec. 20, 2018

(65) Prior Publication Data

US 2019/0201796 A1    Jul. 4, 2019

(51) Int. Cl.
| | | |
|---|---|---|
| *A63H 3/00* | (2006.01) | |
| *A63H 3/16* | (2006.01) | |
| *G06K 7/14* | (2006.01) | |
| *G06K 19/06* | (2006.01) | |
| *G06F 16/955* | (2019.01) | |
| *A63H 3/28* | (2006.01) | |

(52) U.S. Cl.
CPC .............. *A63H 3/006* (2013.01); *A63H 3/16* (2013.01); *A63H 3/28* (2013.01); *G06F 16/955* (2019.01); *G06K 7/1417* (2013.01); *G06K 19/06037* (2013.01)

(58) Field of Classification Search
CPC . A63H 3/006; A63H 3/16; A63H 3/28; G06K 7/1417; G06K 19/06037; G06F 16/955
USPC .................................................. 446/91, 391
See application file for complete search history.

(56) References Cited

U.S. PATENT DOCUMENTS

| | | | | |
|---|---|---|---|---|
| 4,874,343 | A * | 10/1989 | Rosenthal ................ | A63H 3/28 446/175 |
| 6,575,810 | B1 * | 6/2003 | Sohn ...................... | A63H 3/006 273/237 |
| 8,221,182 | B2 * | 7/2012 | Seymour ................ | A63H 33/04 446/120 |
| 9,981,195 | B2 * | 5/2018 | Yarro ...................... | A63H 3/006 |
| 2007/0060011 | A1 * | 3/2007 | Daftari .................... | A63H 3/46 446/97 |
| 2010/0213858 | A1 * | 8/2010 | Kuroki ............... | H05B 33/0815 315/210 |
| 2012/0085829 | A1 * | 4/2012 | Ziegler ................ | G09F 3/0335 235/493 |

* cited by examiner

*Primary Examiner* — Vishu K Mendiratta
(74) *Attorney, Agent, or Firm* — Justin Lampel

(57) ABSTRACT

An interactive figurine with electrical components is provided. The interactive figurine may have a predetermined background story that is provided to the user upon purchase. The electrical components of the interactive figurine may be, for example, touch sensitive arms and/or legs capable of receiving and/or transmitting energy, audio, and other data from a second source. The interactive figurine may contain a rechargeable power source, lights, a microprocessor and an analog switch for controlling arm and/or leg functions. In an embodiment, an audio transmission may be made through the arm(s). A remote may control various features of the figurine. The figurine may also contain connection means to a hand held device for reprogramming of internal microprocessor.

6 Claims, 9 Drawing Sheets

FRONT

BACK

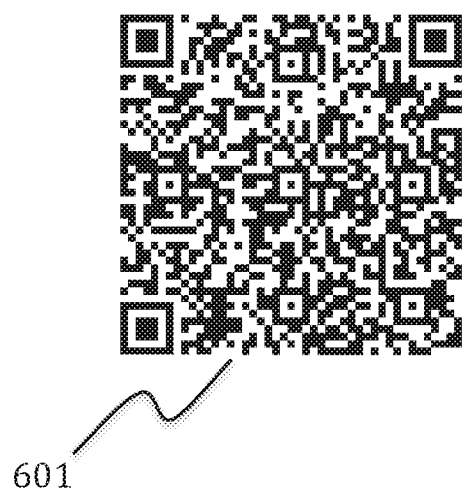
ROBYN
Fig. 6A
GREEN
Fig. 6B

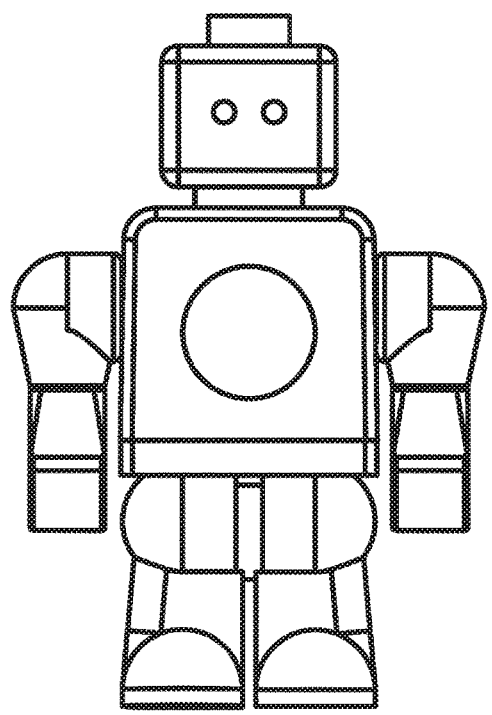
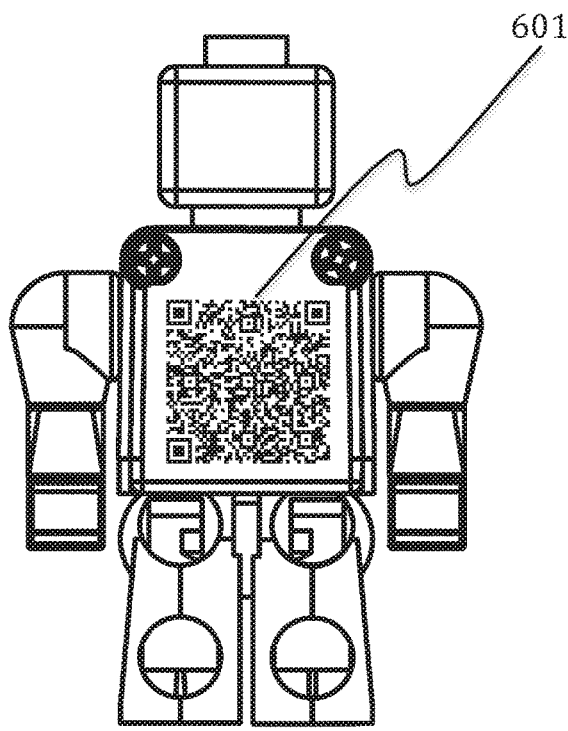
FRONT
BACK
Fig. 7A
Fig. 7B

US 10,632,391 B2

BUILDING BLOCK TOY FIGURINE AND SYSTEM

CROSS-REFERENCE TO RELATED APPLICATIONS

The following application is based on and claims the priority benefit of U.S. provisional application Ser. No. 62/612,531 filed Dec. 31, 2017; the entire contents of which are incorporated by reference.

BACKGROUND OF THE INVENTION

An interactive figurine with electrical components is provided. The interactive figurine may have a predetermined background story that is provided to the user upon purchase. The electrical components of the interactive figurine may be, for example, touch sensitive arms and/or legs capable of receiving and/or transmitting energy, audio, and other data from a second source. The interactive figurine may contain a rechargeable power source, lights, a microprocessor and an analog switch for controlling arm and/or leg functions. In an embodiment, an audio transmission may be made through, for example, the arm(s). A remote may control various features of the figurine. The figurine may also contain connection means to a hand held device for reprogramming of internal microprocessor.

Electronic toy figures and/or LED devices are known. For example, U.S. Pat. No. 6,851,999 to Fong discloses an interactive light emitting diode display having a plurality of individual light-emitting diode units. Each light-emitting diode unit further has at least one light-emitting diode die, an individual driving circuit operative to drive the light-emitting diode die, a micro-controller unit operative to transmit a driving signal to the driving circuit and an activation/inactivation signal, and a transceiver operative to transmit the activation/inactivation signal to activate/inactivate another light-emitting diode unit, and to receive an external activation/inactivation signal.

Further, U.S. Pat. No. 8,517,789 to Barber discloses a toy brick having a housing adapted for releasable engagement to at least one other toy brick and having at least one translucent portion, at least one lighting device arranged inside the housing and adapted to generate light viewable through the at least one translucent portion, at least one battery arranged inside the housing and electrically connected to the at least one lighting device, and at least one switch arranged inside the housing and operable from outside the housing to illuminate the at least one lighting device. The at least one switch can be a motion-activated switch.

Still further, U.S. Design Pat. No. D253,711 discloses an ornamental design for a toy figure.

However, these patents fail to describe an interactive toy figurine and system which is easy to use. A need, therefore, exists for an improved toy figurine and system.

SUMMARY OF THE INVENTION

An interactive figurine with electrical components is provided. The interactive figurine may have a predetermined background story that is provided to the user upon purchase. The electrical components of the interactive figurine may be, for example, touch sensitive arms and/or legs capable of receiving and/or transmitting energy, audio, and other data from a second source. The interactive figurine may contain a rechargeable power source, lights, a microprocessor and an analog switch for controlling arm and/or leg functions. In an embodiment, an audio transmission may be made through, for example, the arm(s). A remote may control various features of the figurine. The figurine may also contain connection means to a hand held device for reprogramming of internal microprocessor.

Toy figurines that mate with building blocks, bricks, and other snap together pieces are very popular for anyone using construction kits. The present figurine may include small shapes that may or may not resemble real world people, animals, or objects that work with a final project being built. The present toy figurines may also be modified, illuminated, or produce sound and motion and may further help develop the creativity of the user. Further, the present figurines may be associated with famous people, history, or stories which may also be used to educate and enhance imagination.

In one embodiment, a miniature figurine is described. The figurine may have a plurality of snap together parts, namely a head, arms, and legs with parts that may be changed to modify the look or performance of the figurine. Located on the body may be a QR code that contains information about the figurine. A QR code (quick response code) is a type of 2D bar code that is often used to provide access to information through a mobile phone.

When an AC or DC electrical voltage is applied between the right leg and the left leg a current flows into the body of the figurine through these conductive legs to power or charge circuits to produce light. There is no polarity required on this voltage to produce the affect.

An advantage of the present device and system is that the present device and system may comprise a body with a removable head, removable arms, and removable legs. The legs may be plated with a thin coat of tin to make them conductive and safe.

Another advantage of the present device and system is that the present device and system may have electrically conductive legs which are electrically insolated from each other to allow an AC or DC voltage to be applied across them.

And an advantage of the present device and system is that the present device and system may have a conductive connector located inside the interior of the main body piece to make an electrical contact to each leg when the leg is attached to the main body. The conductive connector may also transfer the voltage applied to the legs externally to a printed circuit board located within the inside the main body.

Still another advantage of the present device and system is that the present device and system may have a printed circuit board located inside the main body which has a control section that detects the voltage and uses a diode bridge to convert the non polarized AC or DC voltage across the legs to a DC or pulsating DC with a positive and negative output.

And another advantage of the present device and system is that AC may be applied using an external magnetic field and an internal magnetic pickup with no physical contact to the figurine.

Yet another advantage of the present device and system is that the present device and system may have a control center located inside the main body which contains an electrical storage device, such as a capacitor or chargeable battery, that uses the pulsating or constant DC from the diode bridge to create an internal constant DC source that remains when the external voltage is removed.

And another advantage of the present device and system is that the present device and system may have a control circuit which protects the chargeable device from being overcharged and may eliminate damaging voltages or currents.

An advantage of the present device and system is that the present device and system may have an internal chargeable device which is connected to power one or more light sources that may be of constant color, changing colors, solid or flashing. These light sources may be all incorporated within the figurine and regulated by the control center.

Yet another advantage of the present device and system is that the present device and system may have a main body, or a portion thereof, which may be transparent in certain areas or have small openings to allow the internal light to be visible outside of the body.

An advantage of the present device and system is that the present device and system may have a QR bar code on the main body of the figurine which contains information on name, type, and specifications of the figurine. The QR bar code may also include links to stories about the figurine and real world Internet sites to further educate the user on the history and use of the figurine.

Still another advantage of the present device and system is that the present device and system may have a main body having an internal cavity and an external surface. The figurine may have snap together parts, namely a head, arms, body and legs with parts that may be changed to modify the look or performance of the figurine. Located on the main body may be a bar code that contains information about the figurine. Although there are no specific external electrical contact areas for an electrical connection when fully assembled, the legs may be conductive to allow current to flow into or out of the body of the figurine when the legs are attached to the body. When an AC or DC electrical voltage is applied between the right leg and the left leg a current flows into the body of the figurine through these conductive legs to power or charge circuits and a power source. There is no polarity required on this voltage to produce the affect. Internal circuits include a microprocessor that acts as part of a control center to sense any change in the external arms or legs.

An advantage of the present device and system is that the present device and system may produce a response action when, for example, an arm or leg is touched by an object that changes the capacitance or resistance between that arm or leg and another arm or leg.

Still another advantage of the present device and system is that the present device and system may have a control center response which will vary depending on the arms or legs that are touched.

And another advantage of the present device and system is that the present device and system may respond to a touch by a person. The response may include, for example, the transmission of audio or digital data through the arms, changing of colors being generated by the body, changing flashing rates of colors, changing of eye colors, transmission of code using light from body or eyes, waking up the figurine, or putting the figurine in sleep mode, producing motion by controlling tiny motors, and activation of a wireless or infrared communication device. Activation of an audio and digital transmission through the arms was selected in this embodiment.

And an advantage of the present device and system is that the present device and system may have a microprocessor located in the control center which may send an electronic signal for songs or speech to an internal speaker so that audio may be heard directly from the figurine. Or the microprocessor located in the control center may send an electronic signal for songs or speech to the arms. If the arms are in proper contact with an amplifier and speaker system the audio transmitted can be heard.

Yet another advantage of the present device and system is that the present device and system may respond to touching of the proper body parts of the figurine which will then cause the microprocessor located within the control section of the internal printed circuit board to receive programming data through a conductive body contact. In this way the response action may be varied by the program downloaded through the conductive body contact.

Finally, an advantage of the present device and system is that the present device and system may respond to touching the proper body parts of the figurine which will cause the microprocessor located within the control section of the internal printed circuit board to connect and communicate with a personal device such as a cell phone or electronic tablet through a radio frequency (RF) section.

For a more complete understanding of the above listed features and advantages of the present device and system reference should be made to the detailed description and the drawings. Further, additional features and advantages of the invention are described in, and will be apparent from, the detailed description of the preferred embodiments.

BRIEF DESCRIPTION OF THE DRAWINGS

Illustrative embodiments of the present invention are described herein with reference to the accompanying drawings, in which:

FIGS. 6A and 6B illustrate QR codes that add history and description to the figurine in one embodiment.

FIGS. 7A and 7B illustrate a Front and Back view of the figurine with a QR code for a typical figurine in one embodiment.

DETAILED DESCRIPTION OF THE PREFERRED EMBODIMENTS

An interactive figurine with electrical components is provided. The interactive figurine may have a predetermined background story that is provided to the user upon purchase. The electrical components of the interactive figurine may be, for example, touch sensitive arms and/or legs capable of receiving and/or transmitting energy, audio, and other data from a second source. The interactive figurine may contain a rechargeable power source, lights, a microprocessor and an analog switch for controlling arm and/or leg functions. In an embodiment, an audio transmission may be made through, for example, the arm(s). A remote may control various features of the figurine. The figurine may also contain connection means to a hand held device for reprogramming of internal microprocessor.

Figure 1:
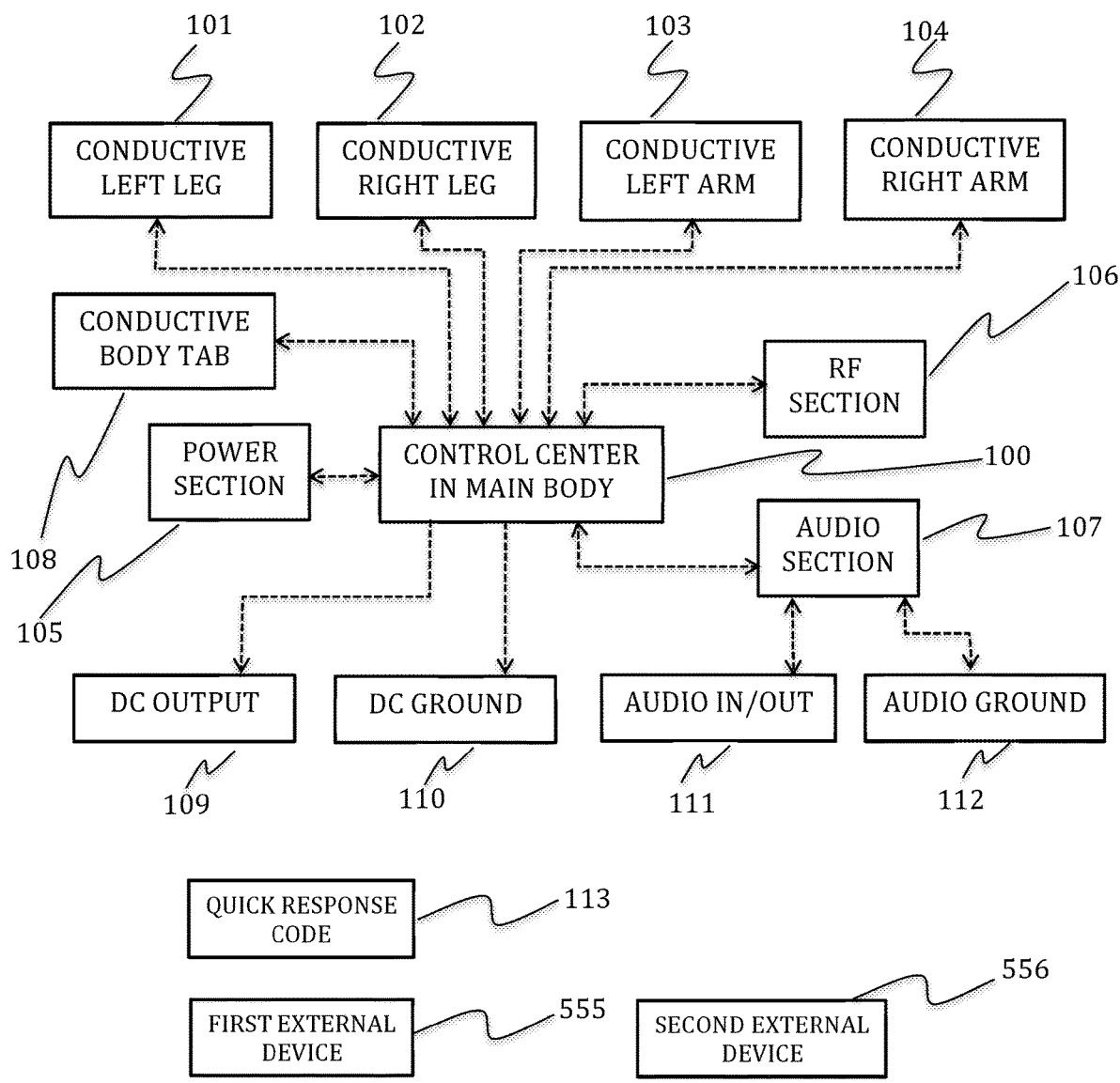
FIG. 1 illustrates a block diagram of figurines as disclosed herein.

Referring first to FIG. 1, in one embodiment, a block diagram of sections of the figurines is provided. The figurines may have a main body 207 having an interior 177 which houses a control center 100. The control center 100 may drive all of the interactive sections such as Power 105, RF (Radio Frequencies) 106, and/or Audio 107. The figures may have legs 101, 102 and arms 103, 104 which may be electrically conductive and used as an input or output connection from the Control Center 100. For example, the left and right legs 101, 102 may be connected to a circuit 400 that converts voltages to proper polarity and magnitude to charge an internal storage component 401, 501 in the power section 105 of the figurine. The legs 101, 102 may therein not only be an electrical component completing a circuit to operate the electrical articles of the device, but the legs 101, 102 may also provide structural support to keep the device in an upright position.

In an embodiment, the entire surface of the legs 101, 102 may be electrically conductive. This allows a second electrical component to touch the legs 101, 102 at any point to conduct electricity. In an embodiment, an internal power source will operate the toy until it discharges (temporary) whereas, when the toy is being charged through, for example, the legs 101, 102 a second, and external power source, will keep the toy running as long as it is connected.

The RF section 106 may be designed, but is not limited to, for communication with external cell phones or other personal devices. The Control Center 100 is capable of transferring music, speech, or other sounds from the external devices to the Audio Section 107. The Audio Section 107 may be connected, through the Control Center 100, to any conductive body part such as a Leg 101, 102 or an Arm 103, 104 to provide audio output 111, 112 to an external listening device like an earphone, or audio amplifier with speakers.

The Control Center 100 may also switch the Legs 101, 102 or Arms 103, 104 to the Power Section 105 to provide external DC Power 109, 110 to devices 555 that are not part of the figurine 200. The Control Center 100 may also have a Conductive Tab 108 that allows an internal programmable device 200 to be reprogrammed or modified by an second external device 556. In one embodiment, a single external device 555 may perform the function of both external devices 555, 556 (IE—power and programmable). In addition the figurine will also have a Quick Response (QR) Code 113 visible to be scanned and provide a history and other details about the figurine. The information in this QR Code 113 may also give information on how to return figurine to owner if lost.

Figure 2:
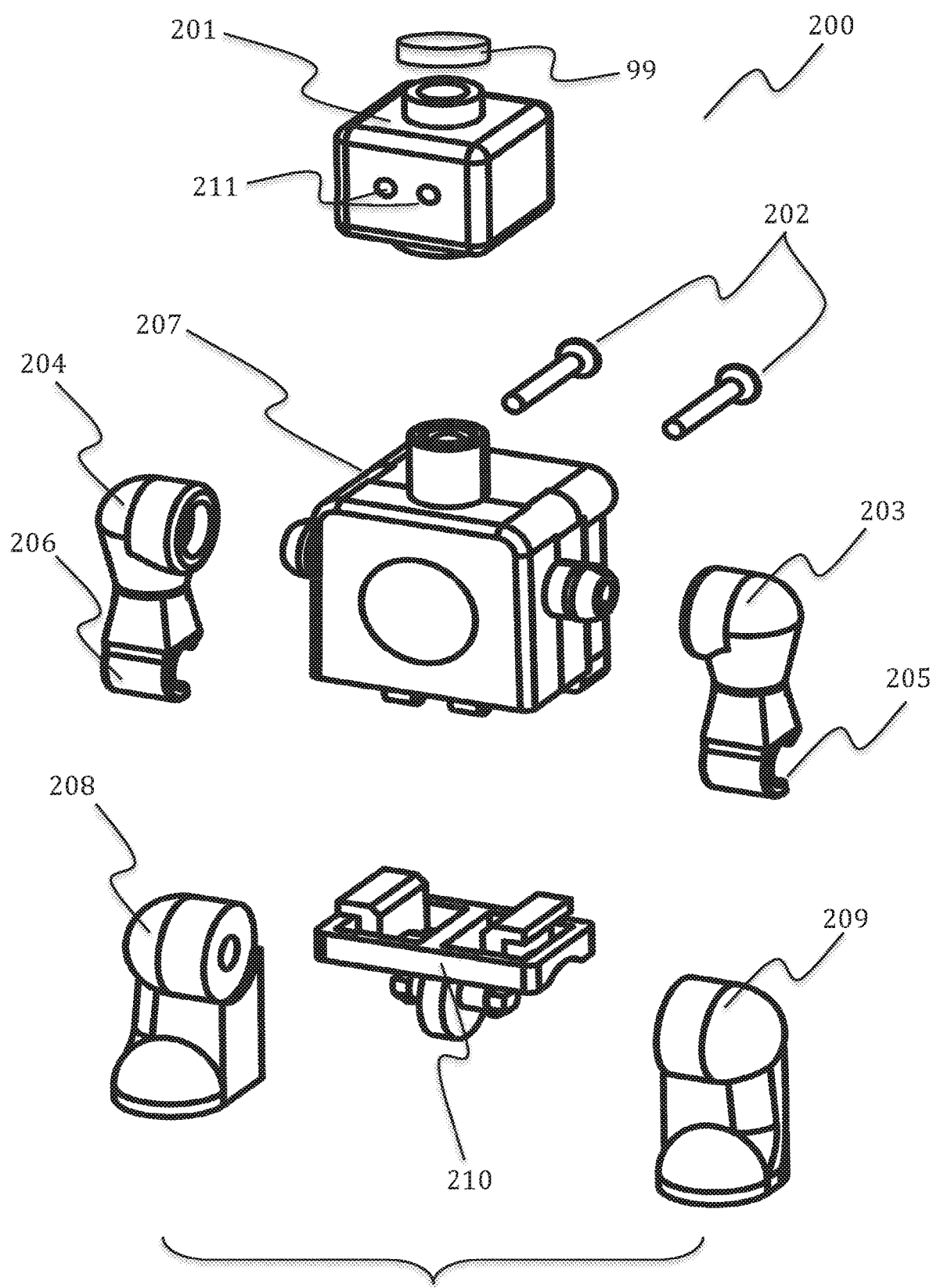
FIG. 2 illustrates an exploded view of one toy figurine in one embodiment.

Referring now to FIG. 2, in an embodiment, an Exploded View of a toy figurine 200 showing the Main Body 207, Head 201, Screws 202, removable Left Arm 203, removable Right Arm 204, Left Hand 205, Right hand 206, removable Left Leg 209, removable Right Leg 208, and removable Lower Body Lid 210 is shown. The assembled back view of this toy Figurine 200 after a QR Code 113, 601 has been added, in one embodiment, is shown in FIG. 7. Once the Main Body 207 and Lower Body Lid 210 are assembled with Screws 202, they become the receptacle for all the other snap together parts 201, 203, 204, 206, 208, 209. These parts 201, 203-206, 208, 209 may be made electrically conductive as required by the specific Control Center 100 in the Main Body 207.

In an embodiment, an optional removable hat 99 may be electrically and mechanically attached to the head 201. In an embodiment, a portion of the main body 207 may be transparent therein allowing a light located within the interior 177 of the main body 207 to be visible outside of the main body 207. Even further, in addition to, or alternative to, the transparent portion of the surface of the main body 207, in an embodiment, the main body 207 may also have an opening 777 for displaying the light located within the interior 177 of the main body 207.

Figure 3:
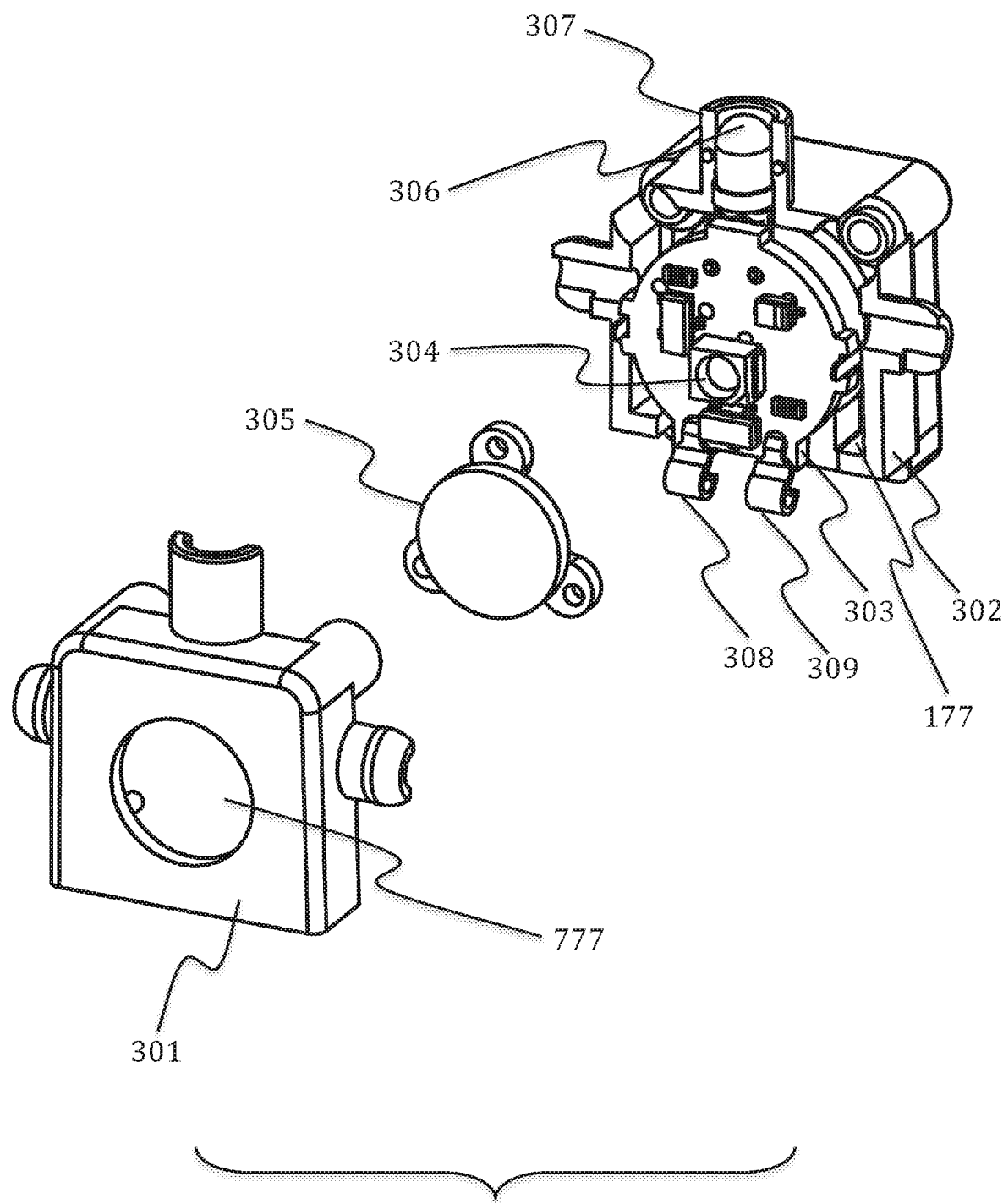
FIG. 3 illustrates an open view of the body of a toy figurine with internal circuitry in one embodiment.
Figure 5:
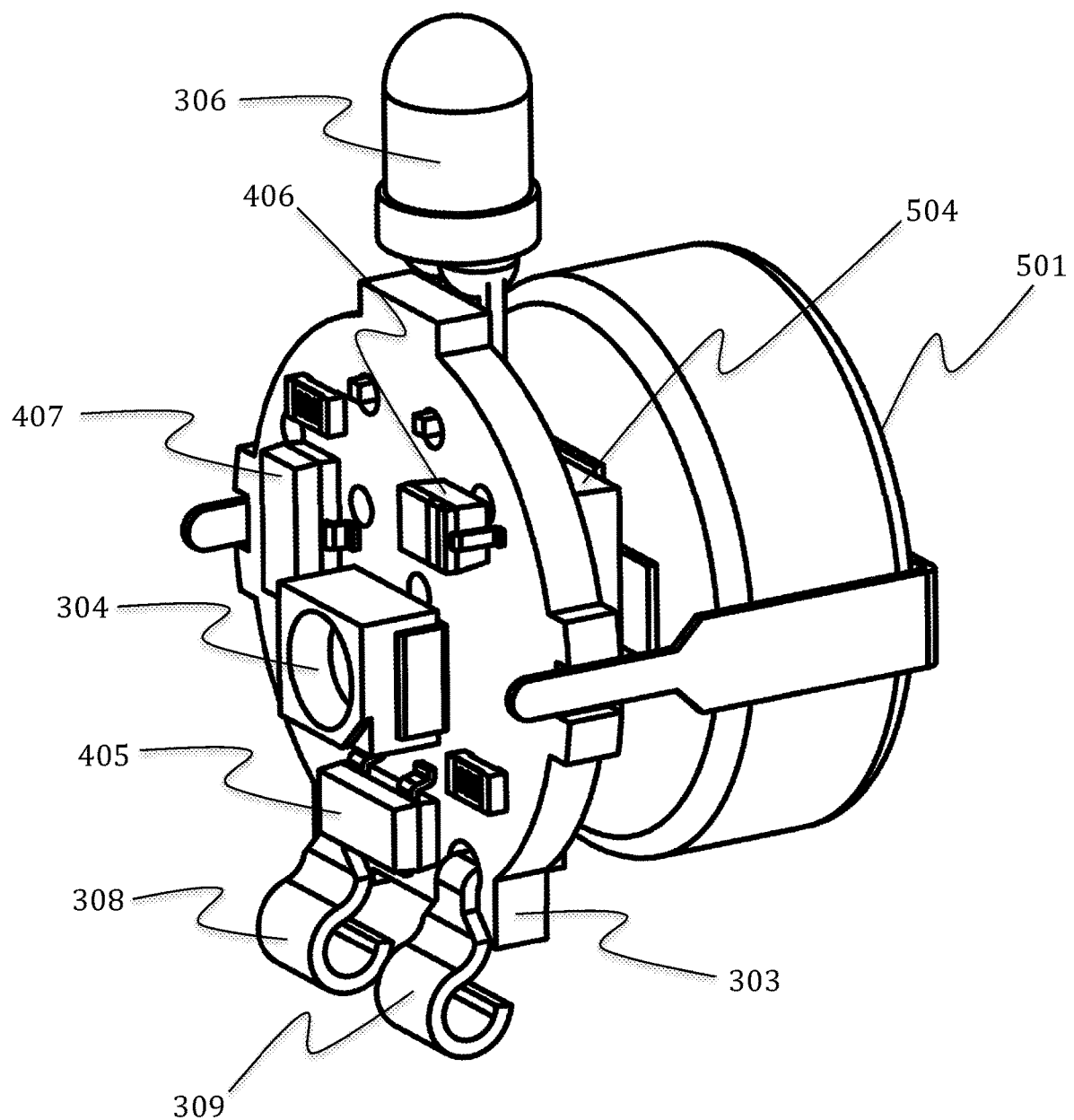
FIG. 5 illustrates an example of parts layout for schematic shown in FIG. 4 in one embodiment.
Figure 9:
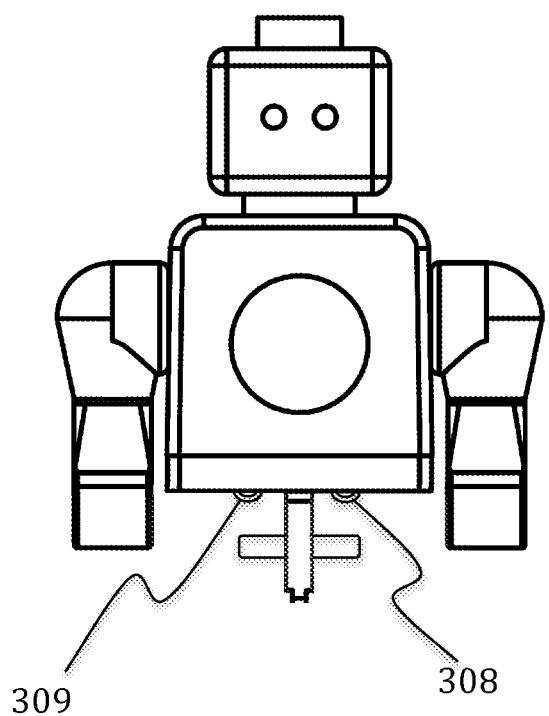
FIG. 9 illustrates an embodiment wherein the conductive connectors can be seen extending outside of the main body before the legs are attached.

Referring now to FIG. 3, in an embodiment, an open view of the Main Body 207 of the toy figurine 200 displaying a Front Body Half 301 and a Back Body Half 302 is provided. In the cavity of the Back Body Half 302 of the Main Body 207 may be mounted a Printed Circuit Board 303 with a first light emitting diode LED1 304 located near the center. Light emitting diode D1 304 is aimed to shine through, in one embodiment, a translucent Plastic Insert 305 that may be mounted in the Front Body Half 301. A second light emitting diode D2 306 may be mounted in, for example, the Neck 307 of the Main Body 207 and may be aimed to shine into the Head 201 of the figurine 200. When the Head 201 is internally illuminated by the LEDs, any Eye Openings 211 will glow. Also shown in FIG. 3 is conductive connector 309 that will contact Left Leg 209 and conductive connector 308 that will contact Right Leg 208. In an embodiment the conductive connector 308, 309 may be, for example, a clip or a spring and ball bearing. As illustrated in FIGS. 5 and 9, the conductive connectors 308, 309 may be located partially within the interior 177 of the main body 207 and a portion of the conductive connectors 308, 309 may extend outside the main body (FIG. 9) so that the legs 208, 209 may be temporarily secured to the main body 207 by snapping the legs 208, 209 onto the conductive connectors 308, 309 by friction, therein forming an electrical and mechanical connection between the legs 208, 209 and the main body 207. It should be understood that, although the figures only show the conductive connectors utilized in connecting the legs 208, 209 to the main body 207, the conductive connectors 308, 309 may also be used to mechanically and electrically connect the other elements of the device, such as the head 201 and arms 203, 204.

The conductive connectors 308, 309 may have, for example, a curved top end and a curved bottom end wherein the curved top end may hook onto and may be directly and removably secured to printed circuit board 303 and wherein the curved bottom end of the conductive connectors 308, 309 may be directly and removably secured to the legs 101, 102. As a result, an electrical current may pass directly from the printed circuit board 303 to the legs 101, 102 through the electrically conductive connectors 308, 309. Preferably, the top end of the conductive connectors 308, 309 is smaller than the bottom of the conductive connectors 308, 309 so that the top end can fit within the limited space of the printed circuit board 303. In an embodiment, only the bottom end of the conductive connectors 308, 309 extends out of the main body 207 while the generally flat middle section and curved top end of the conductive connectors 308, 309 remains within the main body 207. This allows for a more durable connection between the legs 101, 102 and the main body 207.

In one embodiment, a power storage device 501 may temporarily store additional power so that the light emitting device LED1 304 may remain on for at least a short period of time even after the main power source 105 is electrically disconnected from the LED1 light 304 by a person removing the left or right leg 208, 209 from the main body 207; therein breaking the electrical connection between the light 304 and the power source 105. More specifically, in one embodiment, the power source 105 is electrically connected to the light 304 and wherein an electrical connection between the light 304 and the power source 105 must first travel through an exterior surface of at least one of the removably securable first leg or the removably securable second leg 101, 102 in order for the light 304 to be activated.

Figure 4:
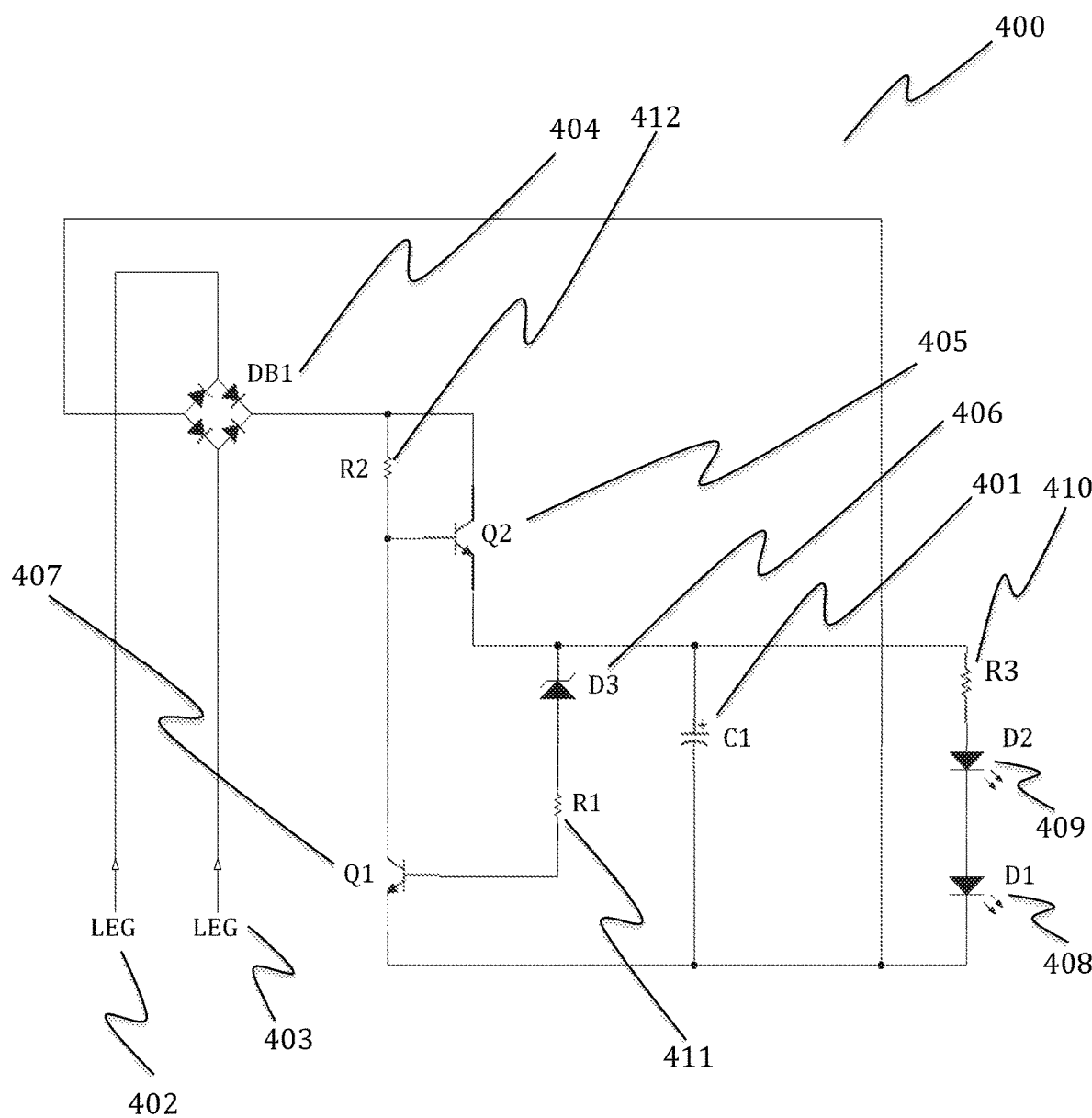
FIG. 4 illustrates an electrical schematic for a toy figurine with lights and power source in one embodiment.

FIG. 4 is a Schematic 400 of a Control Center 100 in a simple toy figurine 200 with lights and power source. If a large enough AC or DC voltage is placed across the two leg Inputs 402, 403 the diode bridge DB1 404 will convert it to a DC voltage of the proper polarity to charge the capacitor C1 401. Charging begins whenever the voltage on the base of the transistor Q2 405 is approximately 0.8 volts higher than the charge on the capacitor C1 401. When the charge on capacitor C1 401 exceeds the voltage drop on the zener diode D3 406 plus the base emitter voltage of transistor Q1 407, the transistor Q1 407 turns on and pulls the base of transistor Q2 405 down to stop or limit the charging current. By picking the proper value for zener diode D3 406 the capacitor C1 401 will be protected from over charging. When C1 401 is charged, current will flow through light emitting diodes D1 408 and D2 409. The amount of current in and therefore the brightness of D1 408 and D2 409 is set by the value of resistor R3 410. Resistor R2 412 sets a limit on charging current for C1 401. Resistor R1 411 limits the current through the zener diode D3 406.

FIG. 5 illustrates the main electronic components on the printed circuit board 303 that were described in the schematic 400 of FIG. 4 in one embodiment. The Power 105 source for this circuit is a super-capacitor C1 401, 501. A super-capacitor or Electric double-layer capacitor (EDLC), may have capacitance values which are much higher than other capacitors and bridges the gap between electrolytic capacitors and rechargeable batteries. They typically store 10 to 100 times more energy than electrolytic capacitors, can accept and deliver charge much faster than batteries, and tolerate many more charge and discharge cycles than rechargeable batteries. Because of the size of C1 401, 501 it is attached on top of other electronic components like the diode bridge DB1 404, 504.

The Printed Circuit Board 303 is a double-sided Printed Circuit Board 303 that allows for electronic components to be mounted on both sides. If the diode bridge DB1 404, 504 side of the Printed Circuit Board 303 is called the back, then the light emitting diode D1 304 is mounted on the front of the Printed Circuit Board 303 and positioned to shine through the translucent Plastic Insert 305. Also mounted on the front of the Printed Circuit Board 303 may be a transistor Q1 407, transistor Q2 405, and/or zener diode D3 406. The conductive legs 208, 209 may press against contact conductive connector 308, 309 to bring power to the Printed Circuit Board 303 and may therein charge the capacitor C1 401, 501. Light emitting diode D2 306 may be mounted to the edge of the Printed Circuit Board 303 in order to shine up the Neck 307 and into the Head 201 of the Figurine 200.

Referring now to FIG. 6, in an embodiment, QR Codes 113, 601, 602 may be used to add history and data to figurines. For example, the QR code for ROBYN 601 may be displayed when scanned by the proper code reader. Or, for example, "My name is Robyn. I am a Lumen. I arrived in 2018. My master is Seymour E. Blox. I am in the story 'Earth One'. Read more about me at myeblox.com/lumen" may be displayed when properly scanned. Still further, the QR code for GREEN 602 might read, for example, "My name is Green. I am a Lumen. I arrived in 2018. You are now my master. Read more about me at myeblox.com/lumen"

FIG. 7 shows the front and back of a typical figurine which may store energy and/or emit light. Besides these simple functions a figurine may also have a Control Center 100 which contains a microprocessor. A microprocessor may be a multipurpose, clock driven, register based, digital-integrated circuit which accepts binary data as input, processes it according to instructions stored in its memory, and provides results as output. Also incorporated into the figurine may be a RF Section 106 that allows communication between, for example, hand-held external devices 555 and the Control Center 100. This RF Section 106 may be a simple Bluetooth device. Bluetooth is a wireless technology standard for exchanging data over short distances from fixed and mobile devices.

FIG. 8 shows how audio may be transmitted through the arms 203, 204 with hands 205, 206. The Arm 203 has a Hand 205 and is one piece of conductive material. Anything that makes an electrical contact with the Arm 203 or Hand 205 will also make an electrical connection to the Control Center 100 that may switch that connection to the Audio Section 107 and the Audio Out 111. At the same time the Arm 204 and Hand 206 can be switched to Audio Ground 112. Electronic connections can be achieved using electronic analog switching. An analog switch may be an electronic component that behaves in a similar way to a relay, but has no moving parts. The switching element may be essentially a pair of MOSFET transistors, one an N-channel device, the other a P-channel device.

Figure 8A:
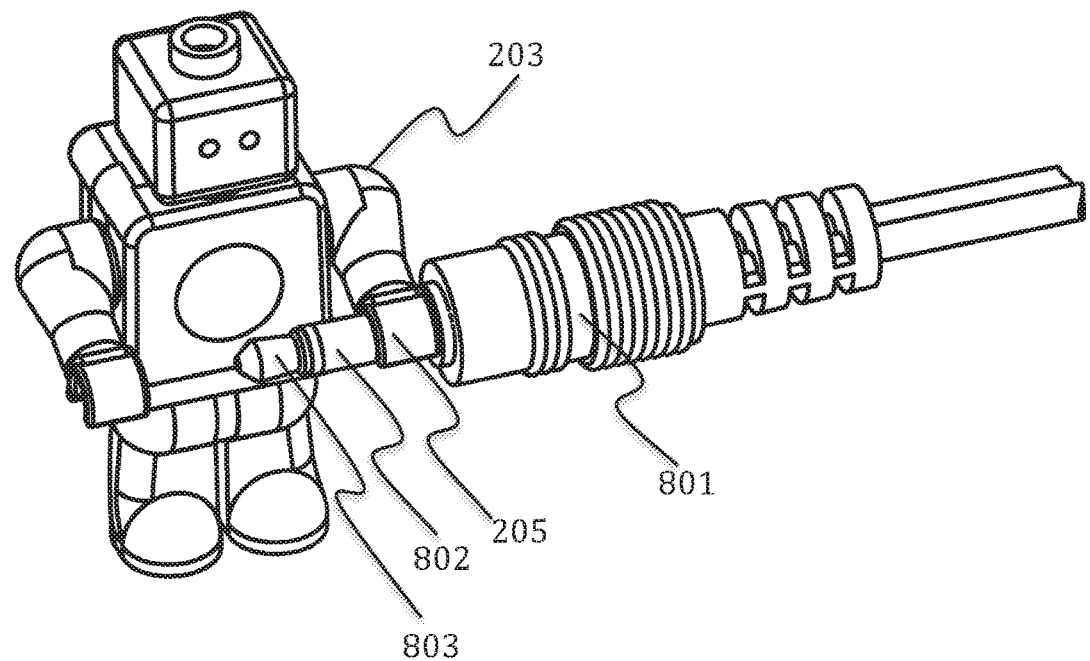
FIGS. 8A and 8B illustrate the transmission of audio through the arms of the toy figurine in one embodiment.
Figure 8B:
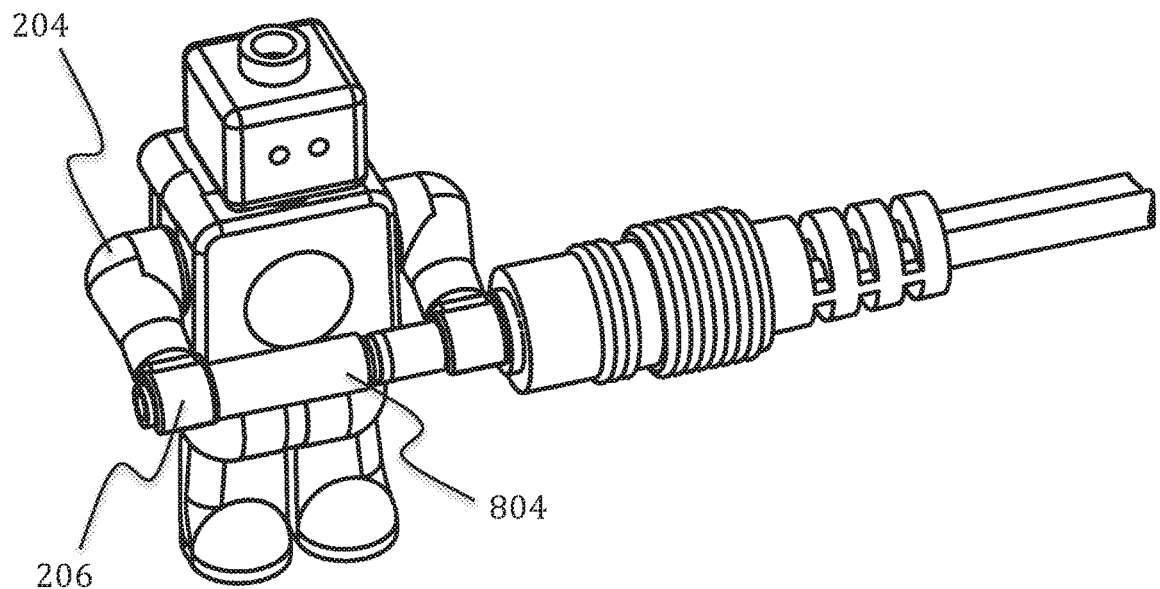

The device may conduct analog and/or digital signals in either direction (bi-directional) when on and isolates the switched terminals when off. The control input to the device is a digital signal that switches between the positive and negative supply voltages, with the more positive voltage switching the device on and the more negative switching the device off. The Left Hand 205 is shown in FIG. 8A holding the Ring 802 of a Cable 801. This Hand 205 and Arm 203 can be switched to Audio Ground 112 of the Figurine placing the Cable 801 Ring 802 at the same ground. FIG. 8B shows an optional coupling Tube 804 electronically connecting the Tip 803 of the Cable 801 and the Hand 206 and Arm 204. This connects the Tip 803 of the audio Cable 801 to the Audio Out 111 of the Figurine. In this manner music, speech, and data can be transmitted through a Cable 801 to other devises.

The Control Center 100 may use the touching of an Arm 203, 205 and/or a Leg 208, 209 to 'wake up' a microprocessor that is in the low power mode or sleeping. When running, the microprocessor may use combinations of Arm 203, 205 and Leg 208, 209 touching to enter various modes of operation. Just a few of these modes can make the Arms 203, 204 capable of driving a toy car, shining a flashlight, sending music and speech to an earphone, controlling other movable toys, and sending power to other small devices. Other modes could be receiving data to reprogram the Control Center 100, communicate through the RF Section 106 with cell phones and other hand held devices, and go to sleep (low power mode).

The Control Center 100 may also use analog switching to make Diode 304 an infrared communication device to control televisions or other remote control devices. These examples are just a few functions possible and in no way should limit the uses or modes of the figurine that could be added by anyone skilled in the Art.

Although embodiments of the invention are shown and described therein, it should be understood that various changes and modifications to the presently preferred embodiments will be apparent to those skilled in the art.

Such changes and modifications may be made without departing from the spirit and scope of the invention and without diminishing its attendant advantages.

I claim:

1. A toy figurine system comprising:
   a toy having a plurality of temporarily securable components wherein the components include a main body having an interior, at least one optionally removably securable head, a removably securable first leg, a removably securable second leg, a removably securable first arm, and a removably securable second arm wherein the removably securable head, the removably securable first leg, the removably securable second leg, the removably securable first arm and the removably securable second arm are removably secured to the main body;
   wherein the removably securable first leg and the removably securable second leg have an exterior surface which is at least partially electrically conductive;
   at least one light wherein the light is produced within the interior of the main body and at least partially visible through an opening or a transparent portion of the main body;
   a power source connected to the light and wherein an electrical connection between the light and the power source travels first through an exterior surface of at least one of the removably securable first leg or the removably securable second leg; and
   a cable having an electrically conductive ring at a terminal end of the cable wherein the toy figurine may become electrically and mechanically connected with the cable once a first hand of the removably securable first arm of the toy figurine temporarily grasps and secures the electrically conductive ring of the cable.

2. The toy figurine system of claim 1 wherein the cable produces an audible sound once activated and supplied with power.

3. The toy figurine system of claim 2 further comprising:
   an optional coupling tube wherein the optional coupling tube may be secured to the terminal end of the cable and wherein a second hand of the second arm of the toy figuring mechanically and electrically is temporarily secured to the optional coupling tube while the first hand of the first arm of the toy figurine mechanically and electrically is temporarily secured to the electrically conductive ring of the cable and wherein an electrical signal passes from the first hand of the toy figurine to the second hand of the toy figurine.

4. A toy figurine system comprising:
   a toy having a plurality of temporarily securable components wherein the components include a main body having an interior, at least one optionally removably securable head, a removably securable first leg, a removably securable second leg, a removably securable first arm, and a removably securable second arm wherein the removably securable head, the removably securable first leg, the removably securable second leg, the removably securable first arm and the removably securable second arm are removably secured to the main body;
   a power source;
   wherein the removably securable first leg and the removably securable second leg each have an exterior surface which is electrically conductive over the entire exterior surface when the toy is in the assembled form and wherein a portion of each of the electrically conductive exterior surfaces of the removably securable first leg and removably securable second leg remains exposed when the removably securable first leg and the removably securable second leg receive electrical signals from the power source and are electrically active in the assembled form;
   at least one light wherein the light is produced within the interior of the main body and at least partially visible through an opening or a transparent portion of the main body;
   wherein the power source is connected to the light and wherein an electrical connection between the light and the power source travels first through an exterior surface of at least one of the removably securable first leg or the removably securable second leg; and
   a cable having an electrically conductive ring at a terminal end of the cable wherein the toy figurine may become electrically and mechanically connected with the cable once a first hand of the removably securable first arm of the toy figurine temporarily grasps and secures the electrically conductive ring of the cable.

5. The toy figurine system of claim 4 wherein the cable produces an audible sound once activated and supplied with power.

6. The toy figurine system of claim 4 further comprising:
   an optional coupling tube wherein the optional coupling tube may be secured to the terminal end of the cable and wherein a second hand of the second arm of the toy figuring mechanically and electrically is temporarily secured to the optional coupling tube while the first hand of the first arm of the toy figurine mechanically and electrically is temporarily secured to the electrically conductive ring of the cable and wherein an electrical signal passes from the first hand of the toy figurine to the second hand of the toy figurine.

* * * * *